(12) United States Patent
Huang et al.

(10) Patent No.: US 8,045,586 B2
(45) Date of Patent: Oct. 25, 2011

(54) METHOD AND APPARATUS FOR TRANSMITTING OVERHEAD INFORMATION

(75) Inventors: Jianbin Huang, Shenzhen (CN); Tianxiang Wang, Shenzhen (CN); Zhiyong Qiu, Shenzhen (CN); Guixue Zhao, Shenzhen (CN); Feng Zhang, Shenzhen (CN); Jun Feng, Shenzhen (CN); Dejun Li, Shenzhen (CN); Yongjun Tu, Shenzhen (CN); Xiaobin Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 524 days.

(21) Appl. No.: 11/958,043

(22) Filed: Dec. 17, 2007

(65) Prior Publication Data
US 2008/0107132 A1    May 8, 2008

Related U.S. Application Data

(63) Continuation of application No. PCT/CN2006/003330, filed on Dec. 7, 2006.

(30) Foreign Application Priority Data
Feb. 27, 2006 (CN) .......................... 2006 1 0057918

(51) Int. Cl.
H04J 3/24 (2006.01)
(52) U.S. Cl. .................................. 370/474; 370/471
(58) Field of Classification Search .................. 370/470, 370/471, 474
See application file for complete search history.

(56) References Cited

U.S. PATENT DOCUMENTS

| | | | |
|---|---|---|---|
| 5,319,707 A * | 6/1994 | Wasilewski et al. | 380/212 |
| 6,449,288 B1 | 9/2002 | Chari et al. | 370/470 |
| 6,731,622 B1 * | 5/2004 | Frank et al. | 370/342 |
| 2002/0031146 A1 * | 3/2002 | Abbas et al. | 370/476 |
| 2002/0101907 A1 * | 8/2002 | Dent et al. | 375/132 |

(Continued)

FOREIGN PATENT DOCUMENTS
CN    1169223 A    12/1997
(Continued)

OTHER PUBLICATIONS

Supplementary European Search Report for Application No. EP06828273, dated Sep. 17, 2008.
(Continued)

*Primary Examiner* — Ricky Ngo
*Assistant Examiner* — Paul Masur
(74) *Attorney, Agent, or Firm* — Finnegan, Henderson, Farabow, Garrett & Dunner LLP

(57) ABSTRACT

A method provided by the present invention for transmitting overhead information, includes dividing and reforming overhead information into at least two overhead parts, inserting the at least two overhead parts into overhead bytes of at least two corresponding data frames, and transmitting the at least two overhead parts via the at least two data frames which are microwave frames. Overhead information transmitting apparatus and overhead information receiving apparatus are also provided by the present invention. With the method and apparatus of the present invention, the channel bandwidth resources occupied by the overhead bytes or each microwave frame are greatly reduced. If the saved channel bandwidth is used for performing the error correction code on the transmitted information, the code gain is improved and the sensitivity requirement on the receiver is reduced so that the cost of a microwave transmitting system is reduced eventually.

10 Claims, 3 Drawing Sheets

U.S. PATENT DOCUMENTS

| | | | |
|---|---|---|---|
| 2002/0114301 A1* | 8/2002 | Yee et al. .................... | 370/338 |
| 2004/0037234 A1* | 2/2004 | Strawczynski et al. ....... | 370/252 |
| 2004/0246891 A1* | 12/2004 | Kay et al. .................... | 370/215 |
| 2004/0258092 A1* | 12/2004 | Sugaya ........................ | 370/474 |
| 2005/0091501 A1* | 4/2005 | Osthoff et al. ................ | 713/181 |
| 2005/0111451 A1 | 5/2005 | Kim | |
| 2005/0226274 A1 | 10/2005 | Kwon et al. | |
| 2006/0034332 A1* | 2/2006 | Haga ........................... | 370/474 |
| 2007/0153726 A1* | 7/2007 | Bar-Sade et al. ............. | 370/329 |

FOREIGN PATENT DOCUMENTS

| | | |
|---|---|---|
| CN | 1681249 A | 10/2005 |
| CN | 1710837 A | 12/2005 |
| EP | 1 150 447 | 10/2001 |
| EP | 1 585 274 | 10/2005 |
| JP | 2005160098 A | 6/2005 |
| WO | WO2007095810 A1 | 8/2007 |

OTHER PUBLICATIONS

"Fixed Radio Systems; Point-to-point equipment; Plesiochronous Digital Hierarchy (PDH); Low and medium capacity digital radio systems operating in the 13 GHz, 15 GHz and 18 GHz frequency bands," ETSI EN 301 128 V1.2.1, Feb. 2001.
First Chinese Office Action dated (mailed) Feb. 6, 2009, issued in related Chinese Application No. 200610057918.5 Huawei Technologies Co., Ltd.
International Search Report for International Application No. PCT/CN2006/003330, mailed Mar. 8, 2007 Huawei Technologies Co., Ltd.
Written Opinion of the International Searching Authority (translation) dated (mailed) Mar. 8, 2007, issued in related Application No. PCT/CN2006/003330 filed Dec. 7, 2006, Huawei Technologies Co., Ltd.
Russian Office Action dated (mailed) Oct. 22, 2009, issued in related Russian Application No. 2008128790 Huawei Technologies Co., Ltd.

\* cited by examiner

METHOD AND APPARATUS FOR TRANSMITTING OVERHEAD INFORMATION

CROSS-REFERENCE TO RELATED APPLICATIONS

This is a continuation of International Application No. PCT/CN2006/003330, filed Dec. 7, 2006, which claims the priority benefit of Chinese Patent Application No. 200610057918.5, filed Feb. 27, 2006, the entire respective disclosures of which are incorporated herein by reference.

FIELD OF THE INVENTION

The present invention relates to microwave transmission technologies, and particularly, to a method for transmitting overhead information, a method for receiving overhead information, overhead information transmitting apparatus and overhead information receiving apparatus.

BACKGROUND OF THE INVENTION

In the field of microwave transmission technologies, strict requirements have been put forward on channel bandwidth occupied by transmitting services with different rates. For example, if four paths of E1 services at a central frequency of 13 GHz are transmitted in Quaternary Phase Shift Keying (QPSK) mode, the European Telecommunications Standards Institute (ETSI) recommends that the channel bandwidth is less than 2.7 MHz. In order to manage the network flexibly, plenty of RFCOH information for management should be transmitted within a limited channel bandwidth.

At present, a conventional RFCOH information transmitting method used in the industry includes the following processes. Firstly, a Plesiochronous Digital Hierarchy (PDH) service or a Synchronous Digital Hierarchy (SDH) service to be transmitted is packaged to form a PDH Payload or SDH Payload; secondly, RFCOH bytes corresponding to each PDH Payload or SDH Payload are inserted in front of the PDH Payload or the SDH Payload to form a microwave frame transmitted in a microwave link. The format of the microwave frame generated by the method is shown in FIG. 1. The RFCOH bytes mainly include a Frame header (FA), an Adaptive Transmission Power Control (ATPC), a network management Data Communication Channel (DCC) byte (DATA), an order wire byte (RSC), a microwave Link path Identification (Link ID), a microwave frame channel performance state detection byte (MVV5) and a microwave frame signal trace byte (MVJ0). The MVV5 consists of an MVB1 bit with BIP2 check format, an MVREI bit for indicating the error indication of a remote microwave station and in MVRDI bit for indicating the alarm (defect indication) of the remote microwave station. In general, for each microwave frame, the above overhead bytes, such as the ATPC, Link ID, MVV5 and MVVJ0 occupy at least four bytes, in which the Link ID occupies two bytes.

SUMMARY

The embodiments of the present invention provide a method for transmitting overhead information, a method for receiving overhead information, an overhead information transmitting apparatus and an overhead information receiving apparatus. With the methods and the apparatus, plenty of overhead bytes can be transmitted in an available transmission bandwidth and the requirement on the receiving sensitivity of a receiver can also be reduced. Therefore, the contradiction among the transmission bandwidth, the transmission of an overhead byte and the receiving sensitivity of the receiver is solved.

A method provided by embodiments of the present invention for transmitting overhead information includes:

dividing and reforming overhead information into at least two overhead parts; inserting the at least two overhead parts into overhead bytes of at least two corresponding data frames, wherein the at least two overhead parts corresponds to the overhead bytes, and transmitting the at least two overhead parts via the at least two data frames, wherein the data frames are microwave frames.

A method for receiving overhead information includes:

receiving at least two data frames;

reading the overhead part borne by each of the at least two data frames; and converting the at least two overhead parts into overhead information, wherein the data frames are microwave frames.

Apparatus provided by embodiments of the present invention for transmitting overhead information includes:

an overhead part generating unit, capable of dividing and reforming overhead information into at least two overhead parts; and a data frame generating unit, capable of inserting the at least two overhead parts received from the overhead part generating unit into overhead bytes of at least two data frames, and transmitting the at least two overhead parts via the at least two data frames, wherein the data frames are microwave frames, and the at least two overhead parts corresponds to the overhead bytes.

Apparatus provided by embodiments of the present invention for receiving overhead information includes:

a data frame receiving unit, capable of receiving at least two data frames, and reading at least two overhead parts from the at least two data frames; and an overhead information recovering unit, capable of converting the at least two overhead parts read by the data frame receiving unit into overhead information, wherein the data frames are microwave frames.

As can be seen, if the existing overhead information transmission method is used, transmission of each microwave frame overhead occupies a relatively large transmission bandwidth, for example, for four paths of E1 services modulated by the QPSK mode, the overhead of the Link ID occupies 1.5% of the channel bandwidth. In this way, on the premise of meeting the requirement of channel bandwidth in the recommendation and regulation formulated by the ETSI, because the overhead byte of the microwave frame occupies relatively large channel bandwidth, an error correction byte in the Payload of each microwave frame for correcting the transmitted information is reduced. The reduction of the error correction code efficiency leads to the reduction of the coding gain, which puts forward a relatively high requirement for the receiving sensitivity of a receiver and leads to the increase of system cost. By using the feature that some overhead bytes of the microwave frame overhead do not need to be transmitted in a high speed adequately, embodiments of the present invention divide the overhead bytes into several parts, and transmit the divided overhead bytes in multiple microwave frames so as to greatly reduce the channel bandwidth occupied by the overhead bytes of each microwave frame. With the method provided by embodiments of the present invention, the saved channel bandwidth may be used for performing the error correction code on the transmitted information, so as to improve the coding gain, reduce the requirement for the receiving sensitivity of the receiver, and reduce the cost of the microwave transmission system eventually.

DETAILED DESCRIPTION OF THE INVENTION

The present invention is further described as follows in detail with reference to the accompanying drawings as well as embodiments so as to make the technical solution and merits of the present invention more apparent.

In a microwave frame overhead byte, a Link ID is mainly used for indicating a microwave transmission link during microwave transmission; the Link ID is an identity number of a microwave link which connects a receiver and a transmitter. At present, the Link ID that should be transmitted or received by a microwave link may be set via software. If a practically received Link ID is different from a Link ID that should be received by a microwave link, a Link ID mismatch alarm is generated for indicating that there is a code error in the Link ID of the microwave link or a microwave signal of an illegal microwave link in reception. Taking the complex condition of a whole network into consideration, Link IDs of 4094 microwave links from 1 to 4094 are defined, and sixteen bits are required to indicate the 4094 microwave links. If the sixteen bits are transmitted iii a microwave frame, two bytes are required. As can be seen from the forgoing description, relatively large channel bandwidth is occupied, which reduces the code gain of borne information. Because a Link ID of a network does not require a relatively high transmission rate, according to an embodiment of the present invention, the Link ID is divided into several parts which are respectively transmitted in several microwave frames. Thus the overhead byte number carried by each microwave frame is reduced and the channel bandwidth occupied by the overhead byte is also decreased. For example, in another embodiment of the present invention, the Link ID byte is divided into two parts which are respectively transmitted by two consecutive microwave frames, one byte is decreased from the overhead bytes carried by each microwave frame.

The above scheme may also be applied to other overhead bytes which do not require a high transmission rate in a microwave frame overhead. The method includes dividing these overhead bytes into several parts, multiplexing the corresponding parts of different overheads, and transmitting the divided parts via multiple microwave frames. Therefore, the overhead byte number carried in each microwave frame is greatly reduced and the channel bandwidth occupied by the overhead bytes transmitted in each microwave frame is also reduced.

The method of the present invention is described as follows in detail according to one embodiment of the present invention. In this embodiment, an overhead byte which can be transmitted at a low speed and can be divided into multi-parts, such as MVV5 overhead information and eight bits of MVJ0 for transmission. The MVV5 overhead information includes four-bit part of the ATPC, sixteen-bit part of the Link ID, one-bit part of the MVREI, one-bit part of the MVRDI and one-bit part of the MVB1.

Figure 2:
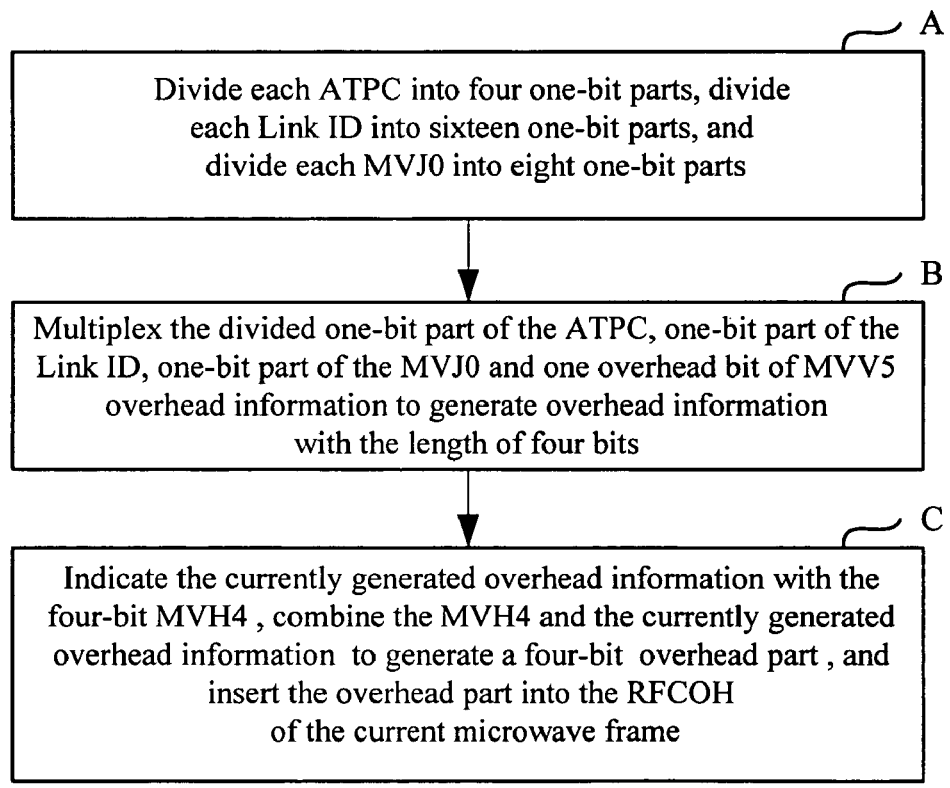
FIG. 2 is a flowchart illustrating a method for transmitting overhead information according to all embodiment of the present invention.

As shown in FIG. 2, the method of the embodiment mainly includes:

Dividing each ATPC into four one-bit parts, and transmitting the four one-bit parts in four consecutive microwave frames each of which carries one-bit part of the ATPC information; dividing each Link ID into sixteen one-bit parts, and transmitting the sixteen parts in sixteen consecutive microwave frames each of which carries one-bit part of the Link ID information; dividing each MVJ0 into eight one-bit parts and transmitting the eight parts in eight consecutive microwave frames each of which carries one-bit part of the MVJ0 information.

Multiplexing one of the sixteen bits which are obtained by dividing four ATPC, one of the sixteen bits which are obtained by dividing one Link ID, one of the sixteen bits which are obtained by dividing two MVJ0, and one of the MVV5, such as an MVREI, all MVRID or an MVB1 to generate sixteen pieces of four-bit overhead information.

Combing a four-bit Multi-Frame Indication (MVH4) for indicating the currently generated sixteen pieces of four-bit overhead information; the MVH4 and the four-bit overhead information which is indicated by the MVH4 to generate sixteen one-byte overhead parts which is named Microwave Frame Overhead (MVOH) parts, and inserting the sixteen overhead parts generated into the RFCOHs of sixteen consecutive microwave frames to generate sixteen microwave frames transmitted in a microwave link.

A receiver of the microwave link may receive the microwave frames using the existing receiving method. After receiving several microwave frames, the receiver may parse the received microwave frames to obtain corresponding overhead bytes according to the division method of each overhead part. For example, after receiving four microwave frames, the receiver may combine the ATPC bits received from the four microwave frames to obtain a complete ATPC overhead; after receiving sixteen microwave frames, the receiver may combine the Link ID bits received from the sixteen microwave frames to obtain a complete Link ID; after receiving eight microwave frames, the receiver may combine the MVJ0 bits received from the eight microwave frames to obtain a complete MVJ0 overhead. Because the overheads divided into multiple overhead parts do not have a strict requirement for the transmission rate in the above embodiment, the method of transmitting the above overhead bytes at a slow rate may be accepted.

Figure 1:
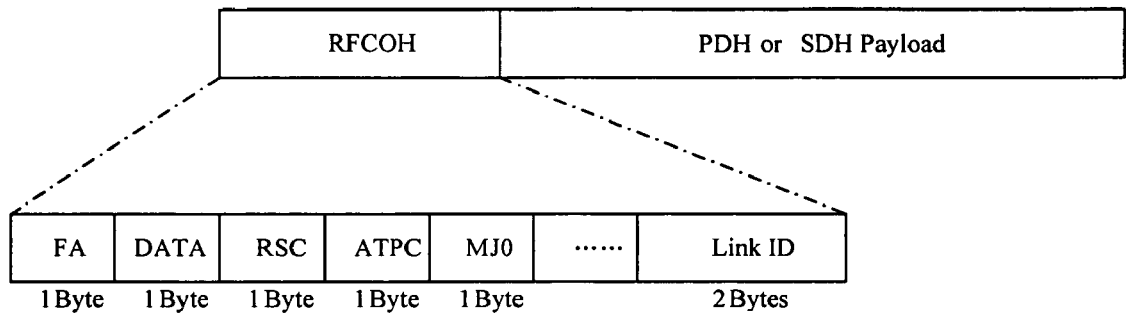
FIG. 1 is a schematic diagram of a conventional microwave frame.
Figure 3:
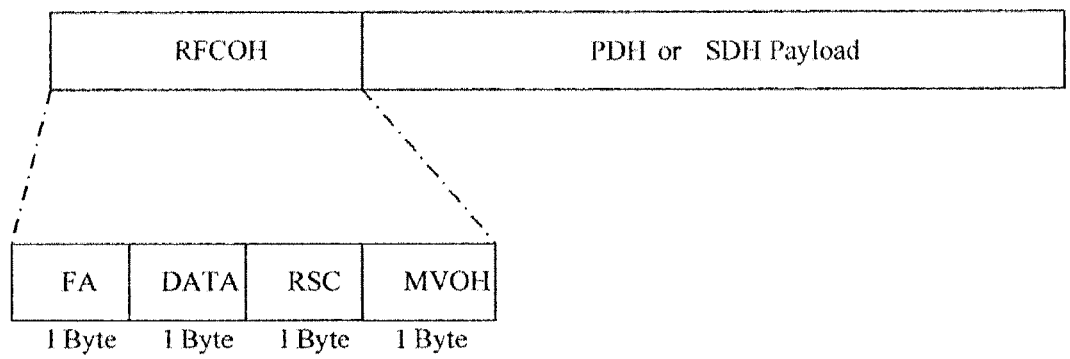
FIG. 3 is a schematic diagram of a microwave frame according to an embodiment of the present invention.

The format of the microwave frames generated by the method of the above embodiment is shown in FIG. 3. Compared with the format of the microwave frames shown in FIG. 1, the number of overhead bytes is reduced from at least seven bytes to four bytes with a reduction of at least three bytes, which can save the channel bandwidth occupied for transmitting overhead bytes greatly.

Figure 4:
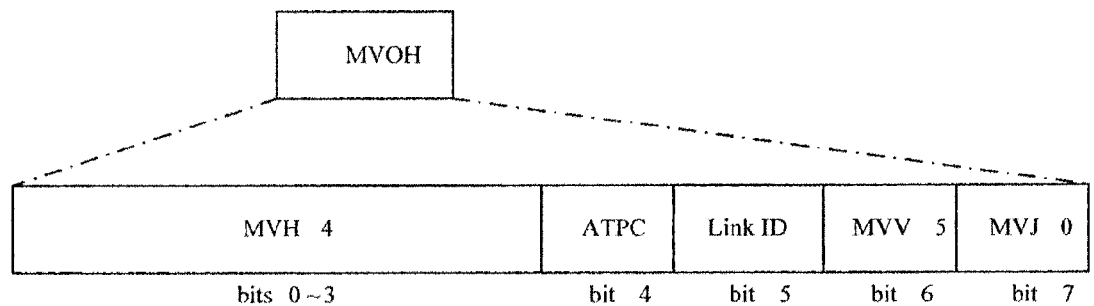
FIG. 4 is a schematic diagram of a Microwave Frame OverHead (MVOH) according to an embodiment of the present invention.

Embodiments of the present invention further provide the method described in B for multiplexing one-bit part of the ATPC, one-bit part of the Link ID, one-bit part of the MVJ0 and an overhead bit of the MVV5 overhead information. Each of the overhead bits carried in one byte overhead part MVOH obtained by the method is shown in FIG. 4. The 0~3 bits of the overhead byte carries four bits of MVH4 for indicating the ATPC bit, the Link ID bit, the MVJ0 bit and the MVV5 overhead bit transmitted by the overhead byte. The fourth bit of the overhead byte carries one-bit part of the ATPC; the fifth bit carries one-bit part of the Link ID; the sixth bit carries one-bit part of the MVV5 overhead; the seventh bit carries one-bit part of the MVJ0. The overhead information corresponding to each MVH4 value is shown in Table 1. The overhead parts transmitted in the overhead bytes of sixteen consecutive microwave frames are also shown in Table 1.

TABLE 1

| MVH4 | 0000 | 0001 | 0010 | 0010 | ... | 1110 | 1111 |
|---|---|---|---|---|---|---|---|
| ATPC | Bit 0 | Bit 1 | Bit 2 | Bit 3 | ... | Bit 2 | Bit 3 |
| Link ID | Bit 0 | Bit 1 | Bit 2 | Bit 3 | ... | Bit 14 | Bit 15 |
| MVV5 | MVB1 | MVB1 | MVREI | MVRDI | ... | MVREI | MVRDI |
| MVJ0 | Bit 0 | Bit 1 | Bit 2 | Bit 3 | ... | Bit 6 | Bit 7 |

The MVH4 includes four bytes for indicating sixteen types of combination of the overhead information, i.e. the tour bytes can respectively indicate different overhead parts transmitted in sixteen microwave frames. As shown in Table 1, one complete ATPC can be transmitted in four consecutive radio frames because each ATPC just includes four bits; one complete Link ID can be transmitted in sixteen consecutive radio frames because each Link ID includes sixteen bits; one complete MVJ0 can be transmitted in eight consecutive radio frames because each MVJ0 includes eight bits; the MVV5 can be circularly transmitted in the order of MVB1, MVB1 MVREI and MVRDI.

As can be seen from the above embodiment of the present invention, the method may reduce the channel bandwidth occupied by the overhead bytes in each microwave frame greatly by dividing the overhead bytes into several parts and transmitting the parts being multiplexed to the receiver via multiple microwave frames. It is noted that the overhead bytes do not have a strict requirement for the transmission rate. If the saved channel bandwidth is used for performing error correction code on the transmitted information, the contradiction among the transmission bandwidth, the transmission of the overhead bytes and the receiving sensitivity of the receiver is solved, the code gain is improved, and the sensitivity requirement for the receiver and the cost of microwave transmission system are reduced.

Figure 5:
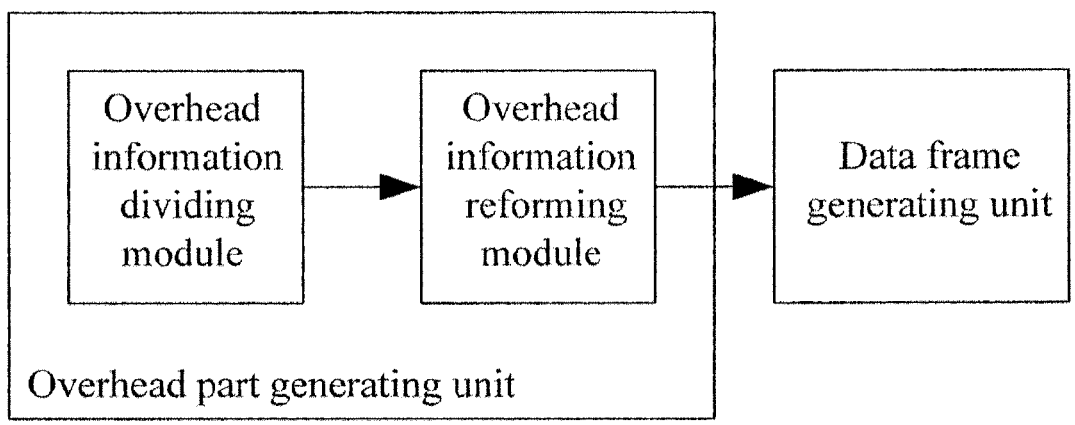
FIG. 5 is a schematic diagram of apparatus for transmitting overhead information according to tai embodiment of the present invention.

An overhead information transmission apparatus is further disclosed by another embodiment of the present invention. As shown in FIG. 5, the internal structure of the apparatus includes an overhead part generating unit and a data frame generating unit.

The overhead part generating unit is used for dividing overhead information to be transmitted and reforming the divided overhead information into at least two overhead parts, and transmitting the at least two overhead parts to the data frame generating unit.

The data frame generating unit is used for inserting the at least two overhead parts from the overhead part generating module into overhead bytes of at least two data frames corresponding to the overhead parts one-to-one, and transmitting the at least two overhead parts via the at least two data frames.

The overhead part generating unit further includes an overhead information dividing module and an overhead information reforming module.

The overhead information dividing module is used for dividing various overhead information to be transmitted into at least two information parts respectively, mid transmitting the divided information ports of various overhead information to the overhead information reforming module respectively.

The overhead information reforming module is used for reforming the received information parts of various overhead information into at least two overhead parts.

Referring to the embodiment shown in FIG. 5, at first, the overhead information dividing module includes at least one component configured to divide each ATPC to be transmitted into four one-bit parts, divide each Link ID into sixteen one-bit parts, divide each MVJ0 into eight one-bit parts, and transmit the divided ATPC, Link ID, MVJ0 and other overhead information to be transmitted to the overhead information reforming module in the overhead part generating unit.

And then, the overhead information reforming module of the overhead part generating unit includes at least one component configured to multiplex one-bit part of the ATPC divided, one-bit part of the Link ID divided, one-bit part of the MVJ0 divided and one overhead bit of the MVV5 overhead information, for example MVREI, MVRDI, or MVB1 to generate four-bit overhead information. The overhead information reforming module further comprises at least one component configured to combine a four-bit MVH4 for indicating the currently generated four-bit overhead information and the four-bit overhead information which is identified by the MVH4 to generate a one-byte MVOH, and transmit the generated MVOH to the data frame generating unit.

The data frame generating unit inserts the received MVOH into the RFCOH of the microwave frame to generate a microwave frame transmitted in a microwave link.

Figure 6:
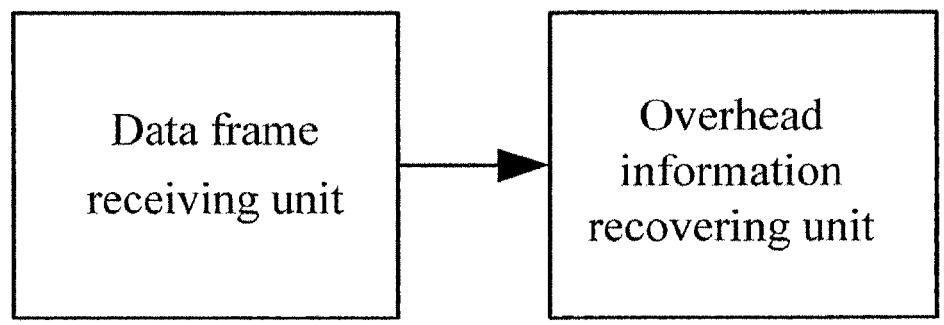
FIG. 6 is a schematic diagram of apparatus for receiving overhead information according to an embodiment of the present invention.

An overhead information receiving apparatus is also provided by an embodiment of the present invention to receive the data frame. As shown in FIG. 6, the internal structure of the apparatus includes a data frame receiving unit and an overhead information recovering unit.

The data frame receiving unit is used for reading at least two overhead parts from the received at least two data frames.

The overhead information recovering unit is used for recovering the at least two overhead parts read by the data frame receiving unit into overhead information.

Referring to the embodiment shown in FIG. 2, the data frame receiving unit includes at least one component configured to combine the ATPC bits received from four microwave frames to generate a complete ATPC overhead, combine the Link ID bits received from sixteen microwave frames to generate a complete Link ID, and combine the MVJ0 bits received from eight microwave frames to generate a complete MVJ0 overhead. The overhead information recovering unit comprises at least one component configured to recover all overhead information received from the data frame receiving unit.

It may be understood by those skilled in the field that the overhead information transmitting apparatus and the overhead information receiving apparatus may be integrated to implement the transmitting and receiving function of overhead information simultaneously.

It should be noted that, the above embodiments only provide an implementing mode, and the method of the present invention is not limited to the dividing and multiplexing mode for the overhead bytes in the above embodiments; it may be understood by those skilled in the prior art that, using any dividing and multiplexing mode for the overhead bytes may attain the objective of decreasing the overhead bytes number and reducing the channel bandwidth occupied by the transmitted overhead bytes. The method of the present invention may also be applied to other overhead transmission technologies apart from the microwave transmission technology to solve the contradiction among the transmission bandwidth, the transmission of overhead byte and the receiver sensitivity.

The invention claimed is:

1. A method for transmitting overhead information, comprising:
dividing each of several overhead information parts of overhead information of a microwave frame into at least a first and a second overhead part, wherein the several overhead information parts comprise an Adaptive Transmission Power Control (ATPC), a microwave Link path Identification (Link ID), a microwave frame channel performance state detection byte (MVV5), and a microwave frame signal trace byte (MVJ0);
multiplexing the first overhead part of each of the several overhead information parts to generate first overhead information;
multiplexing the second overhead part of each of the several overhead information parts to generate second overhead information;
combining the first overhead information with a first microwave multi-frame indication;
inserting the combination of the first overhead information and the first microwave multi-frame indication into an overhead of a first microwave data frame;
combining the second overhead information with a second microwave multi-frame indication;
inserting the combination of the second overhead information and the second microwave multi-frame indication into an overhead of a second microwave data frame; and
transmitting the first and the second microwave data frame.

2. The method of claim 1, wherein dividing each of several overhead information parts of overhead information of a microwave frame into at least a first and a second overhead part comprises:
dividing each ATPC into four one-bit parts, dividing each Link ID into sixteen one-bit parts, and dividing each MVJ0 into eight one-bit parts;
multiplexing the divided one-bit part of the ATPC, one-bit part of the Link ID, one-bit part of the MVJ0 and one overhead bit carried by the MVV5 overhead information to generate four-bit overhead information;
combining the four-bit overhead information with a four-bit Microwave Frame Multi-frame Indication (MVH4) to obtain a one-byte overhead information part of the first microwave data frame.

3. The method of claim 1, wherein transmitting the first and the second microwave data frame further comprises:
transmitting the second microwave data frame after transmitting the first microwave data frame.

4. A method for receiving overhead information, comprising:
receiving at least a first and a second microwave data frame;
reading an overhead byte from the first microwave data frame, and an overhead byte from the second microwave data frame; and
parsing the overhead byte from the first microwave data frame to obtain a first overhead part according to a first microwave multi-frame indication in the first microwave data frame; and
parsing the second overhead byte from the second microwave data frame to obtain a second overhead part according to a second microwave multi-frame indication in the second microwave data frame; and
assembling the first overhead part and the second overhead part to obtain the overhead information corresponding to a division method from a transmitting party,
wherein the first overhead part and the second overhead part each comprises an Adaptive Transmission Power Control (ATPC), a microwave Link path Identification (Link ID), a microwave frame channel performance state detection byte (MVV5), and a microwave frame signal trace byte (MVJ0).

5. The method of claim 4, wherein assembling the first overhead part and the second overhead part into overhead information of the microwave data frames corresponding to a division method from a transmitting party further comprises:
combining four one-bit parts of the ATPC from four microwave data frames into an ATPC overhead part, combining sixteen one-bit parts of the Link ID from sixteen microwave data frames into a Link ID overhead part, combining eight one-bit parts of the MVJ0 from eight microwave data frames into an MVJ0 overhead part, and reading an MVV5 overhead part; and
combining the ATPC overhead part, Link ID overhead part, MVJ0 overhead part and the MVV5 overhead part to obtain the overhead information.

6. An overhead information transmitting apparatus, comprising:
an overhead part generating unit, configured to divide each of several overhead information parts of overhead information of a microwave frame into at least a first and a second overhead part, and multiplex the first overhead part of each of the several overhead information parts to generate first overhead information; and multiplex the second overhead part of each of the several overhead information parts to generate second overhead information; and combine the first overhead information and a first microwave multi-frame indication, and combine the second overhead information and a second microwave multi-frame indication, wherein the several overhead information parts comprise an Adaptive Transmission Power Control (ATPC), a microwave Link path Identification (Link ID), a microwave frame channel performance state detection byte (MVV5), and a microwave frame signal trace byte (MVJ0); and
a data frame generating unit, configured to insert the combination of the first overhead information and the first microwave multi-frame indication received from the overhead part generating unit into an overhead of a first microwave data frame, and to insert the combination of the second overhead information and the second microwave multi-frame indication received from the overhead part generating unit into an overhead of a second microwave data frame, and transmit the first and the second microwave data frames.

7. The overhead information transmitting apparatus of claim 6, wherein the overhead part generating unit comprises:
an overhead information dividing module, configured to divide each of several overhead information parts of overhead information of a microwave frame into at least a first and a second overhead part; and
an overhead information reforming module, configured to multiplex the first overhead part of each of the several overhead information parts to generate first overhead information; and multiplex the second overhead part of each of the several overhead information parts to generate second overhead information; and combine the first overhead information and a first microwave multi-frame indication, and combine the second overhead information and a second microwave multi-frame indication.

8. The overhead information transmitting apparatus of claim 7, wherein:

the overhead information dividing module is configured to divide each ATPC into four one-bit parts, divide each Link ID into sixteen one-bit parts, and divide each MVJ0 into eight one-bit parts; and the overhead information reforming module is configured to multiplex the divided one-bit part of the ATPC, one-bit part of the Link ID, one-bit part of the MVJ0 and one overhead bit carried by the MVV5 overhead information to generate four-bit overhead information, and combine a four-bit MVH4 and the four-bit overhead information to obtain a one-byte overhead part.

9. An overhead information receiving apparatus, comprising:

a data frame receiving unit, configured to receive at least a first and a second microwave data frame, and read an overhead byte from the first microwave data frame, and an overhead byte from the second microwave data frame; and an overhead information recovering unit, configured to parse the overhead byte from the first microwave data frame to obtain a first overhead part according to a first microwave multi-frame indication combined in the first microwave data frame; and parse the overhead byte from the second microwave data frame to obtain a second overhead part according to a second microwave multi-frame indication combined in the second microwave data frame; and assemble the first overhead part and the second overhead part to obtain the overhead information corresponding to a division method from a transmitting party, wherein the first overhead part and the second overhead part each comprises an Adaptive Transmission Power Control (ATPC), a microwave Link path Identification (Link ID), a microwave frame channel performance state detection byte (MVV5), and a microwave frame signal trace byte (MVJ0).

10. The overhead information receiving apparatus of claim 9, wherein:

the data frame receiving unit is configured to combine four one-bit parts of the ATPC from four data frames into an ATPC overhead part, combine sixteen one-bit parts of the Link ID from sixteen data frames into a Link ID overhead part, combine eight one-bit parts of the MVJ0 from eight data frames into an MVJ0 overhead part, and read an MVV5 overhead part; and the overhead information recovering unit is configured to combine the ATPC overhead part, Link ID overhead part, MVJ0 overhead part and the MVV5 overhead part received from the data frame receiving unit into the overhead information.

* * * * *